J. E. RHODES.
DEMOUNTABLE RIM.
APPLICATION FILED MAY 19, 1919.
1,333,630.
Patented Mar. 16, 1920.
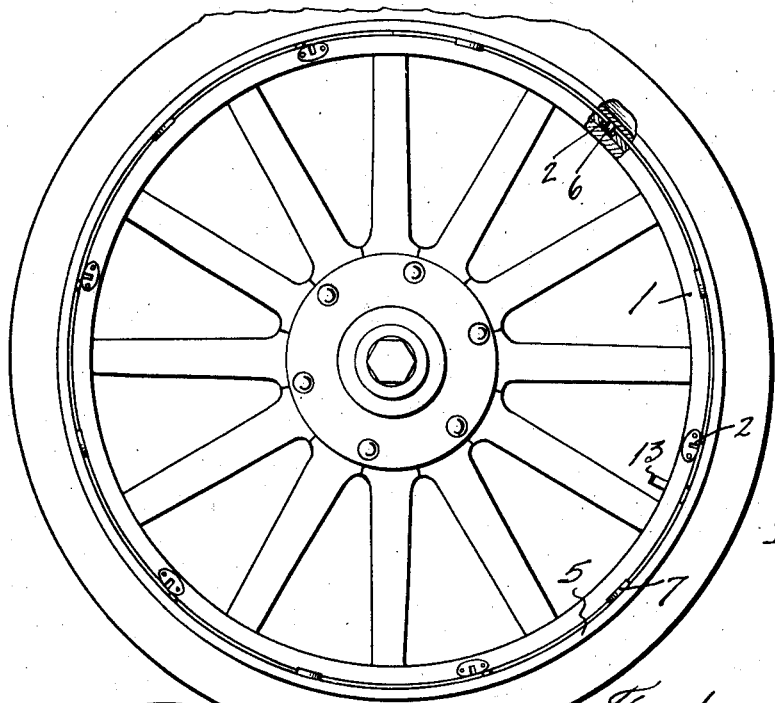
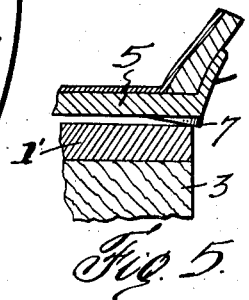
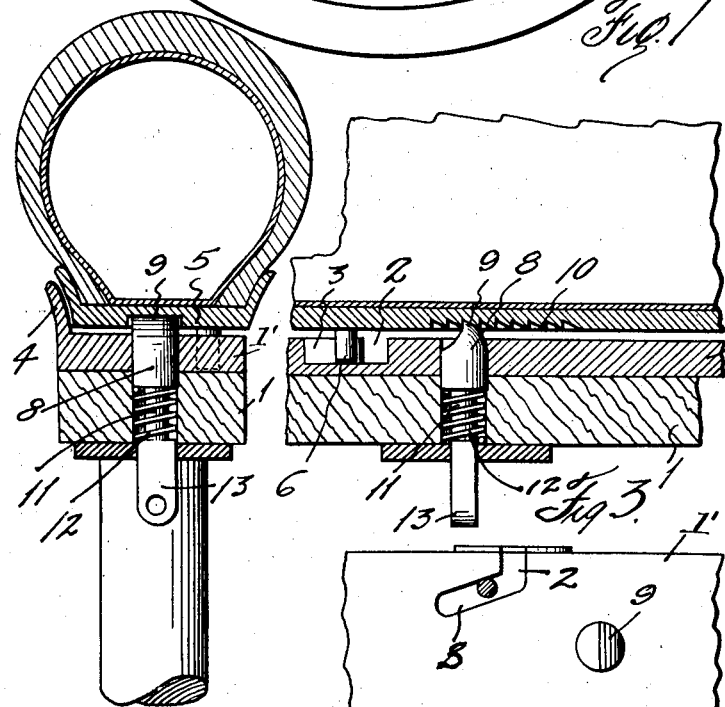
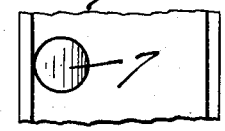
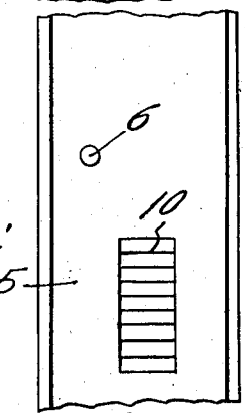
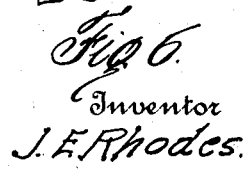
Inventor
J. E. Rhodes.
By Jack N. Ashley
Attorney

UNITED STATES PATENT OFFICE.

JOHN E. RHODES, OF DALLAS, TEXAS.

DEMOUNTABLE RIM.

1,333,630.  Specification of Letters Patent.  Patented Mar. 16, 1920.

Application filed May 19, 1919. Serial No. 298,034.

*To all whom it may concern:*

Be it known that I, JOHN E. RHODES, a citizen of the United States, residing at Dallas, in the county of Dallas and State of Texas, have invented certain new and useful Improvements in Demountable Rims, of which the following is a specification.

This invention relates to new and useful improvements in demountable rims.

The purpose of the invention is to provide a rim which may be quickly mounted and fastened on a wheel and as quickly unfastened and demounted, by simple imparting a slight circumferential movement to the rim.

In carrying out the invention the rim is provided with studs adapted to angular grooves in the felly band of the wheel, whereby the rim is drawn onto the felly band by the inward angular displacement of the studs when the rim is revolved. A simple fastening is provided for holding the rim against circumferential movement. Wedge-shaped bosses are provided on the inner periphery of the rim and as the latter is revolved the bosses wedge between the felly band and the rim, thus holding the latter tightly on the felly.

The invention will be more readily understood from a reading of the following specification and by reference to the accompanying drawings, in which an example of the invention is shown and wherein:

Figure 1 is a side elevation of a wheel equipped with my improved rim,

Fig. 2 is a cross sectional detail at the locking plunger,

Fig. 3 is a longitudinal detail of the same,

Fig. 4 is a detail in plan of a portion of the felly band,

Fig. 5 is a cross sectional detail, and

Fig. 6 is a view of a portion of the inner face of the rim.

In the drawings the numeral 1 designates the felly of a wheel surrounded by a felly band 1'. Angular grooves 2 are provided in the face of the felly band and are equally spaced apart. Each groove has an entrance portion exactly transverse of the felly band and an angular portion 3 extending diagonally of the felly. The felly band has a circumferential flange 4 at one side. A suitable rim 5 is provided on its inner surface with inwardly directed studs 6 spaced so as to enter the grooves when the rim is slid onto the felly band.

It will be seen that the rim may easily be placed on the felly band with the studs in the transverse portions of the grooves. By giving the rim a slight circumferential movement the studs ride into the diagonal portions of the grooves whereby the rim is forced onto the felly band and into engagement with the flange 4. By reversing the movement the rim may easily be removed.

In order to insure a tight fit the rim has on its following side wedge-shaped bosses 7. These bosses wedge on the felly band as the rim is fed onto the felly. These bosses obviate play and form a substantial connection between the parts.

For preventing an independent circumferential movement of the felly or rim a locking plunger 8 is mounted in the felly. This plunger has a ratchet head 9 adapted to engage transverse serrations 10 on the inner surface of the rim. The plunger has a reduced shank 11 surrounded by a coiled spring 12 and surmounted by a finger piece 13 exposed on the inner periphery of the felly.

When the rim is turned onto the felly band the serrations ride over the head 9 which engages in the same and holds the rim against reverse movement. Before the rim can be removed the plunger must be withdrawn. The finger piece 13 is shaped so that by giving it a quarter turn when it is withdrawn from its slot it will be withheld.

To mount the rim it is merely necessary to present the same to the felly band so that the studs 6 enter the grooves 2 and then by turning the rim circumferentially the studs ride into the diagonal portion 3, thus forcing the rim onto the felly band. The portion 3 are directed so that the tendency of the studs is to ride further into the same as the wheel revolves when the car is driven.

To remove or demount the rim the finger-piece 13 is pulled inward and given a quarter turn which locks it in position and withdraws the head 9 from the serrations 10. The rim may then be "backed" off the felly band.

What I claim, is:

1. In a demountable rim, the combination with a wheel felly band having angular grooves, and means of securing the rim and felly band against relative circumferential movement, of radial studs carried by the rim and engaging in the grooves of the felly band abutted by the rim, and wedge-shaped bosses carried by the rim and engaging on the felly band.

2. In a demountable rim, the combination with a wheel felly band having angular grooves, the said grooves having an entrance portion transverse of the felly band and an angular portion extending diagonally of the felly band, and a locking means to prevent relative circumferential movement of the rim and felly band, of radial studs carried by the rim and engaging in the grooves of the felly band abutted by the rim, the said studs acting to draw the rim onto the felly band by a circumferential movement of the rim, and wedge-shaped bosses carried by the rim and engaging on the felly band.

In testimony whereof I affix my signature.

JOHN E. RHODES.